(12) United States Patent
Orologio

(10) Patent No.: US 6,562,439 B2
(45) Date of Patent: May 13, 2003

(54) THERMAL AND MOISTURE RESISTANT INSULATIVE SHEET

(76) Inventor: Furio Orologio, 10 Dansk Court, Unit 6, Etobicoke, Ontario (CA), M9W 5T8

( * ) Notice: Subject to any disclaimer, the term of this patent is extended or adjusted under 35 U.S.C. 154(b) by 0 days.

(21) Appl. No.: 10/225,975

(22) Filed: Aug. 22, 2002

(65) Prior Publication Data

US 2002/0197450 A1 Dec. 26, 2002

Related U.S. Application Data

(63) Continuation of application No. 09/559,769, filed on Apr. 27, 2000, now Pat. No. 6,514,596.

(51) Int. Cl.$^7$ .................................................. B32B 3/12
(52) U.S. Cl. ....................................................... 428/178
(58) Field of Search ................................ 428/166, 178, 428/72.76; 264/349; 156/60, 598; 52/135, 169.11, 169.14, 310, 396.04, 396.06, 403.1, 407.5, 408, 741.11, 741.3, 745.05

(56) References Cited

U.S. PATENT DOCUMENTS

| 4,181,548 | A | 1/1980 | Weingarten |
| 4,313,993 | A | 2/1982 | McGlory |
| 4,535,828 | A | 8/1985 | Brockhaus |
| 4,825,089 | A | 4/1989 | Lindsay |

*Primary Examiner*—Donald J. Loney
(74) *Attorney, Agent, or Firm*—Bell, Boyd & Lloyd LLC

(57) ABSTRACT

A composite bubble-pack assembly comprising (i) a first bubble-pack having a first thermoplastic film having a plurality of portions wherein each of the portions defines a cavity and a second thermoplastic film in sealed engagement with the first film to provide a plurality of closed cavities; (ii) a second bubble-pack having a third thermoplastic film having a plurality of portions wherein each of the portions defines a cavity, and a fourth thermoplastic film in sealed engagement with the third film to provide a plurality of closed cavities; (iii) and a film selected from the group consisting of a thin foil of metal or a metallized thermoplastic film interposed between and bonded to the first bubble-pack and the second bubble-pack.

7 Claims, 3 Drawing Sheets

THERMAL AND MOISTURE RESISTANT INSULATIVE SHEET

The present application is a continuation of U.S. patent application Ser. No. 09/559,769, filed Apr. 27, 2000, now U.S. Pat. No. 6,514,596, the contents of which are hereby incorporated by reference in their entirety and relied upon.

FIELD OF THE INVENTION

This invention relates to bubble-pack thermal and moisture resistant insulation materials for use in the construction of buildings, roads, septic fields, aircraft runways and the like.

BACKGROUND TO THE INVENTION

It is well known to use separating sheets of materials to thermally separate construction materials from underground soils. These materials are also used to hold and retain the different layers of sand and rocks used in the construction of roads which under the repetitive action of freeze and thaw leads to cracks and holes in the exposed external layer of the roads. These materials are also used as moisture barriers in buildings under construction, especially underneath the concrete floor of the basement that otherwise would be directly in contact with the soil and the moisture.

However, the aforesaid materials are generally formed as rigid or semi-rigid insulating panels which have a strong tendency to crack and break apart under heavy loads which, thus decreases their efficacy. Furthermore, they are difficult to install and are limited in size because of transportation problems.

Further, although, these materials are made in such a way that they do not transfer heat by conduction or convection, they generally have a relatively high reflective surface material that still allows radiation heat transfer that is fairly significant for large surfaces.

Insulation materials are also know which comprise a clean, non-toxic, heat barrier made of aluminum foil bonded to a single or double layer of polyethylene-formed bubbles spaced one bubble from another bubble in the so-called "bubble-pack" arrangement. Non-foil bubble-packs are used extensively as packaging material, whereas the metal foil bubble-pack sheet is used as thermal insulation in wood frame structures, walls, attics, crawl spaces, basements and the like and as wrapping for hot water heaters, hot and cold water pipes, air ducts and the like. The reflective surface of the metal, particularly, aluminum foil enhances the thermal insulation of the air-containing bubble-pack.

Generally, low density polyethylene films of 1–12 mil, optionally, with various amounts of linear low density polyethylene in admixture when additional strength is required, are used for the above applications. The insulating properties of the bubble pack primarily arise from the air in the voids. Typically, bubble diameters of 1.25 cm, 0.60 cm and 0.45 cm are selected.

In certain environments, the aluminum foil of the prior art assemblies are vulnerable to chemical attack or delamination from the thermoplastic film by reason of being exposed to detrimental chemicals, acidic or alkaline vapours or the like.

Further, to reduce the risk of such undesired chemical attack and, also, to utilize the radiative insulative property of the aluminum surface, a space or gap is left between the prior art assembly and the wall, strut and the like adjacent the assembly. This results in a relatively larger combined unit than would otherwise be desired.

There is, therefore a need for a thermal and moisture resistant, insulation pack for use in road and building construction that is of a simple form, low cost to manufacture which is flexible, easy to carry and apply, provides reduced radiative heat transfer and provides reduced total unit construction volume.

SUMMARY OF THE INVENTION

It is an object of the present invention to provide an enhanced thermal and moisture resistant insulation sheet for use in road and building construction that is sufficiently flexible as to be readily adapted to be carried, installed and enhanced weight resistant.

It is a further object to provide a thermal and moisture insulation sheet which is environmentally more stable to attack on the metal and delamination.

It is a further object to provide a thermal and moisture resistant insulative sheet for use in abutement with an adjacent wall, strut and the like to provide an insulative barrier system of reduced thickness.

Accordingly, in one aspect, the invention provides a composite bubble-pack assembly comprising (i) a first bubble-pack having a first thermoplastic film having a plurality of portions wherein each of said portions defines a cavity and a second thermoplastic film in sealed engagement with said first film to provide a plurality of closed said cavities; (ii) a second bubble-pack having a third thermoplastic film having a plurality of portions wherein each of said portions defines a cavity and a fourth thermoplastic film in sealed engagement with said third film to provide a plurality of closed said cavities; and (iii) a film selected from the group consisting of a thin foil of metal or a metallized thermoplastic film interposed between and bonded to said first bubble-pack and said second bubble-pack.

The terms "cavity" or "cavities" in this specification include voids, bubbles or other like closed spaces. The cavities may be formed of any desired suitable shape, such as, for example, of a semi-cylindrical, oblong or rectangular form. However, a generally hemi-spherical cavity is preferred.

The number, size and layout of the bubble in the pack according to the invention may be readily selected, determined and manufactured by the skilled artisan. Typically, in a single pack, the bubbles are arrayed in a coplanar off-set arrangement. Each of the hemi-spherical bubbles may be of any suitable diameter and height protruding out of the plane of the bonded films. Typically, the bubble has a diameter selected from 0.5 cm–5 cm, preferably 0.8–1.5 cm; and a height selected from 0.2 cm–1 cm, preferably 0.4 cm–0.6 cm. A preferred bubble-pack has an array of about 400 bubble per 900 $cm^2$.

The thermoplastic films may be formed of any suitable polymer or copolymer. The first, second, third and fourth films may be formed of the same or different material. Most preferably, the assembly has each of the thermoplastic films formed of a polyethylene or a nylon. A most preferred plastic is polyethylene, particularly a low-density polyethylene, optionally, in admixture with a linear low density polyethylene of use as aforesaid first and second films.

The composite assembly of the invention further comprises one or more foils, layers, films, laminates or the like of a suitable metal, for example, aluminum or a metallized thermoplastic film within the assembly to enhance reflection of infra-red radiation.

Preferably, the aluminum foil forms part of the laminate having the foil heat sealed between a pair of polyethylene films to provide a better seal to the pair of bubble arrays.

The composite bubble-pack assembly according to the invention is of particular value when used in an environment that has a detrimental effect on the exposed metal when the latter is used as an outer film on bubble packs according to the prior art. Since, in the present invention, the metal is, in effect, embedded in a double thermoplastic-air-filled void system, it is remote from metal-attaching chemicals or an environment which effects metal-thermoplastic film delamination.

Further, I have found that in order for the metal foil to be efficacious in providing reflective heat reduction when bonded as an outer film, there needs to be a gap or space between the metal foil and adjacent wall, ground or like member. This, thus, often results in a thicker than desired insulative assembly. In contrast, the composite assembly according to the invention has an inherently built-in air space adjacent each side of the metal foil to provide the desired reflective property. This, thus, offers a more compact fully insulative package, sheet and the like than the prior art.

Thus, the assembly according to the invention comprises an insulative sheet that provides air spaces on both sides of a metal or metallized foil which provides thermal and moisture insulation enhancement to the assembly and physical protection to the foil, in the rough and tough environment of placement adjacent to concrete, soil and other natural ground conditions, comprising particulate matter such as gravel and lime.

The sheet according to the invention is flexible and easy to apply to cover objects of a plurality of shapes.

The sheet effects useful reduction of heat transfer in each of the conduction, convection and radiation modes, notwithstanding the relative thinness of the sheet.

Further, the metal foil is protected from direct attack by most chemical agents that do not attack the thermoplastic layers.

BRIEF DESCRIPTION OF THE DRAWINGS

In order that the invention may be better understood, preferred embodiments will now be described by way of example only, with reference to the accompanying drawings, wherein.

DETAILED DESCRIPTION OF PREFERRED EMBODIMENTS

Figure 1:
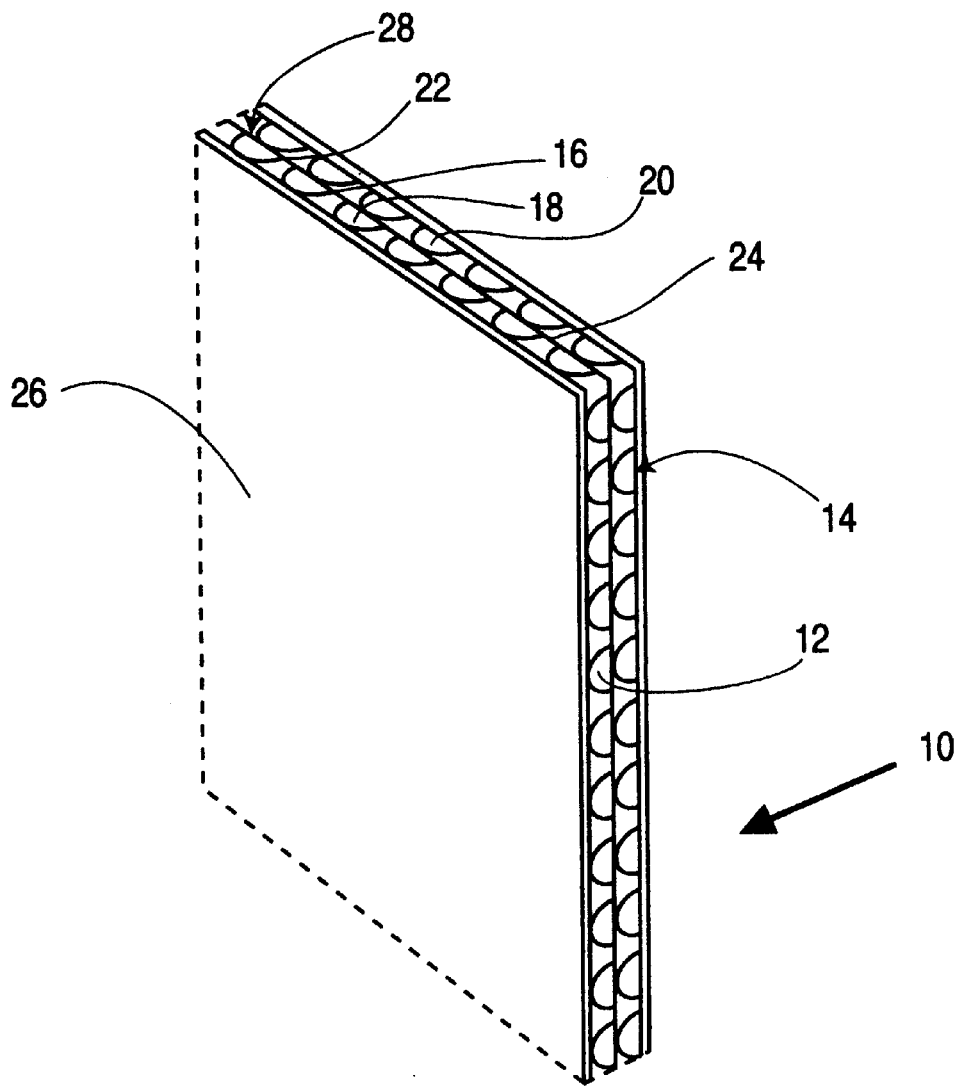
FIG. 1 is an isometric view of an insulation panel comprising a bubble-pack assembly according to the prior art.

With reference to FIG. 1, this show generally as 10, a double layer, bubble-pack with aluminum foil insulation assembly according to the prior art. The double layer consists of a pair of bubble arrays 12, 14 bonded together through an intervening low density polyethylene film 16. Arrays, 12, 14 are formed of a plurality of bubble or sealed cavities 18, 20, respectively, from a 5 mil polyethylene film 22, 24, respectively. Each of films 22, 24 at their outer surfaces is bonded to a reflective aluminum foil 26, 28, respectively, to provide the whole assembly with external aluminum surfaces.

Assembly 10 has approximately twenty, 1 cm diameter, 0.5 cm high bubbles per 30 cm length and breadth within each of films 22, 24.

The aforesaid assembly 10 is made by a double hot roller thermal and vacuum forming process for cavity forming and lamination sealing techniques known in the art.

Figure 2:
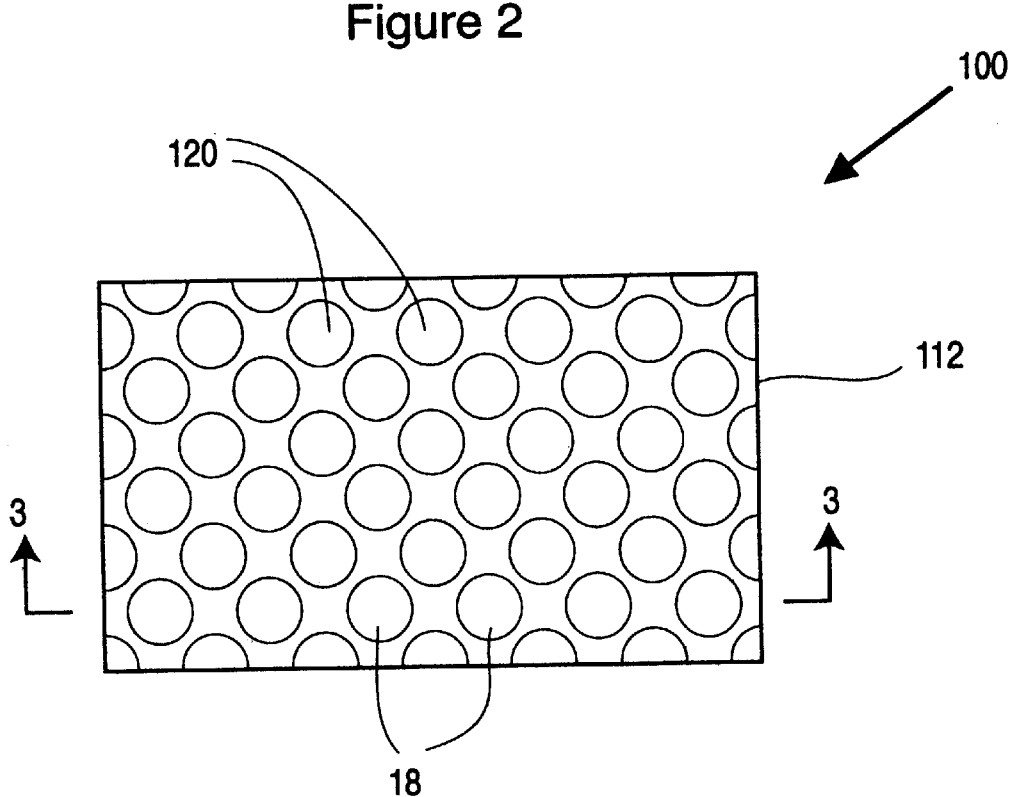
FIG. 2 is a diagrammatic top plan view of an embodiment insulation panel comprising a bubble-pack assembly according to the invention.
Figure 3:
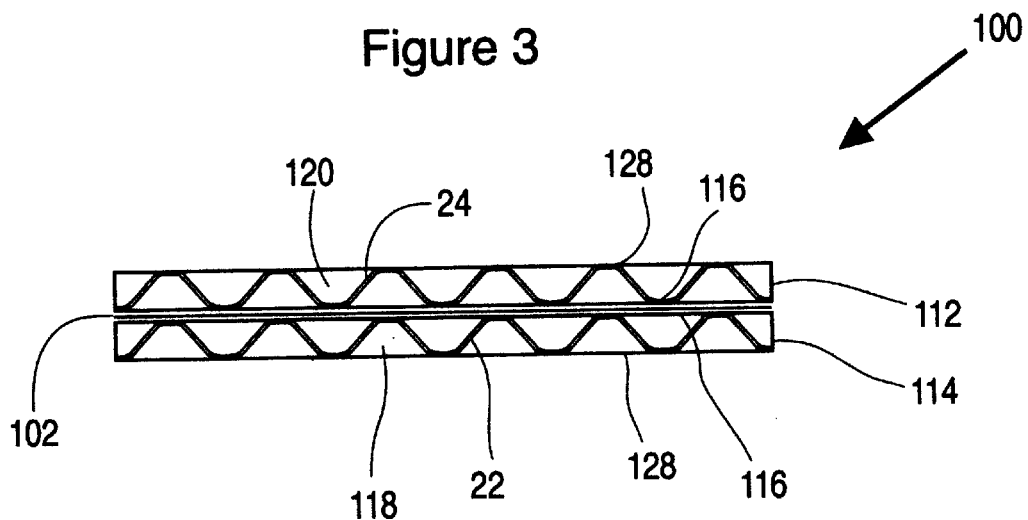
FIG. 3 is a diagrammatic enlarged sectional view taken along the line 3—3 of FIG. 2.

With reference to FIGS. 2 and 3, these show generally as 100 a composite double bubble-pack assembly according to the invention, having an aluminum foil 102 disposed between and bonded to bubble arrays 112 and 114 formed as for prior art FIG. 1 assembly. Bubbles 118 and 120 are encapsulated between polyethylene films 116 and 128.

Aluminum foil 102 has a low emissivity value of less than 5% on each surface to essentially eliminate heat transfer by radiation.

Each of the single bubble-pack layers 112, 114 provides both thermal conduction and convection insulation, and, in combination with the aluminum surfaces, excellent radiation insulation.

The composite bubble-pack 100 offers significant resistance to heavy loading whereby appreciative non-breakage of the air bubbles is often found. Preferably, outer layers 128 are made slightly thicker than inner layers 116 to better resist abrasion. Additional water resistance or abrasion resistant films may be bonded or formed laminated to layer 128. Such resultant composite bubble-pack assemblies are of particular use in the construction of roads, septic fields, aircraft runways and the like.

Further, in consequence that composite assemblies of the invention have better thermal R-values than prior art assemblies, thinner or higher insulative assemblies may be provided. Thinner assemblies, say 0.2 cm–0.8 cm thick facilitate the manufacture, transportation and handling of rolls of different desired sizes.

In alternative embodiments, but still illustrated by FIGS. 2 and 3, metal foil 102 is substituted with a strong and resistant plastics of a very thin, preferably a few hundred angstroms (1 angstrom equals $10^{-10}$ m), layer of metallic deposition on each side to provide the low emissivity surfaces.

Figure 4:
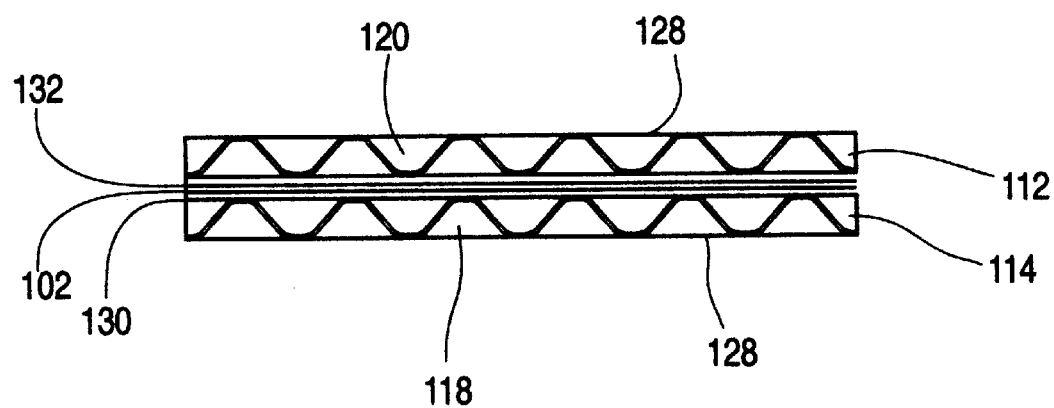
FIG. 4 is a schematic sectional view of an alternative embodiment according to the invention; and wherein the same numerals denote like parts.

FIG. 4 shows a similar embodiment to that of FIG. 3 wherein foil 102 is laminated by heat sealing between a pair of 2 mil polyethylene films 130 and 132 between bubble arrays 12, 14, at one of films 16.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. A method for separating construction materials from underground soil, comprising placing a composite bubble-pack assembly between said construction materials and said underground soil, wherein said composite bubble-pack assembly comprises:
(i) a first bubble pack having a first thermoplastic film having a plurality of portions wherein each of said portions defines a cavity and a second thermoplastic film in sealed engagement with said first film to provide a plurality of closed said cavities;
(ii) a second bubble-pack having a third thermoplastic film having a plurality of portions wherein each of said portions defines a cavity and a fourth thermoplastic film in sealed engagement with said third film to provide a plurality of closed said cavities; and (iii) a film selected from a thin foil of metal or a metallized thermoplastic film interposed between and bonded to said first bubble-pack and said second bubble-pack.

2. The method of claim 1, wherein said metal or metallized thermoplastic is a laminate layer interposed between a pair of polyethylene films to constitute a laminate interposed between and bonded to said first bubble-pack and said second bubble-pack.

3. The method of claim 1, wherein said metal is aluminum.

4. The method of claim 1, wherein at least one of said first, second, third and fourth films is formed of a thermoplastic selected from the group consisting of a low density polyethylene, a linear low density polyethylene and a nylon.

5. The method of claim 1, wherein said bubble-pack assembly has a thickness selected from 0.4 cm to 1.2 cm.

6. The method of claim 1, wherein said construction materials is selected from the group consisting of sand, gravel, lime and concrete.

7. The method of claim 6, wherein said construction materials is concrete.

* * * * *

(12) EX PARTE REEXAMINATION CERTIFICATE (5705th)
United States Patent
Orologio

(10) Number: US 6,562,439 C1
(45) Certificate Issued: Mar. 13, 2007

(54) THERMAL AND MOISTURE RESISTANT INSULATIVE SHEET

(76) Inventor: Furio Orologio, 10 Dansk Court, Unit 6, Etobicoke, Ontario (CA), M9W 5T8

Reexamination Request:
No. 90/007,521, Apr. 25, 2005

Reexamination Certificate for:
Patent No.: 6,562,439
Issued: May 13, 2003
Appl. No.: 10/225,975
Filed: Aug. 22, 2002

Related U.S. Application Data

(63) Continuation of application No. 09/559,769, filed on Apr. 27, 2000, now Pat. No. 6,514,596.

(51) Int. Cl.
*E02D 3/00* (2006.01)
*B32B 15/08* (2006.01)

(52) U.S. Cl. .................. 428/178; 52/741.1; 52/741.3; 405/229; 405/232

(58) Field of Classification Search ............... 52/741.1, 52/741.3; 428/178; 405/229, 232
See application file for complete search history.

(56) References Cited

U.S. PATENT DOCUMENTS 5,428,093 A * 6/1995 Lee .............................. 524/317
5,549,956 A 8/1996 Handwerker .................. 428/73
6,514,596 B1 * 2/2003 Orologio ..................... 428/166

FOREIGN PATENT DOCUMENTS

GB 2 186 253 8/1987
WO WO 9114828 A1 * 10/1991

OTHER PUBLICATIONS

Home Masonry Repairs & Projects, Black & Decker Home Improvement Library, Cy DeCosse Incorporated, 1995, p. 34.*
Step–by–Step Masonry & Concrete, Better Homes and Gardens Books, Meredith Corporation, 1997, p. 57.*
Jacobs, Jr., David H., Concrete: A Homeowner's Illustrated Guide, TAB Books, 1992, pp. 167–171.*

* cited by examiner

*Primary Examiner*—Stephen Stein

(57) ABSTRACT

A composite bubble-pack assembly comprising (i) a first bubble-pack having a first thermoplastic film having a plurality of portions wherein each of the portions defines a cavity and a second thermoplastic film in sealed engagement with the first film to provide a plurality of closed cavities; (ii) a second bubble-pack having a third thermoplastic film having a plurality of portions wherein each of the portions defines a cavity, and a fourth thermoplastic film in sealed engagement with the third film to provide a plurality of closed cavities; (iii) and a film selected from the group consisting of a thin foil of metal or a metallized thermoplastic film interposed between and bonded to the first bubble-pack and the second bubble-pack.

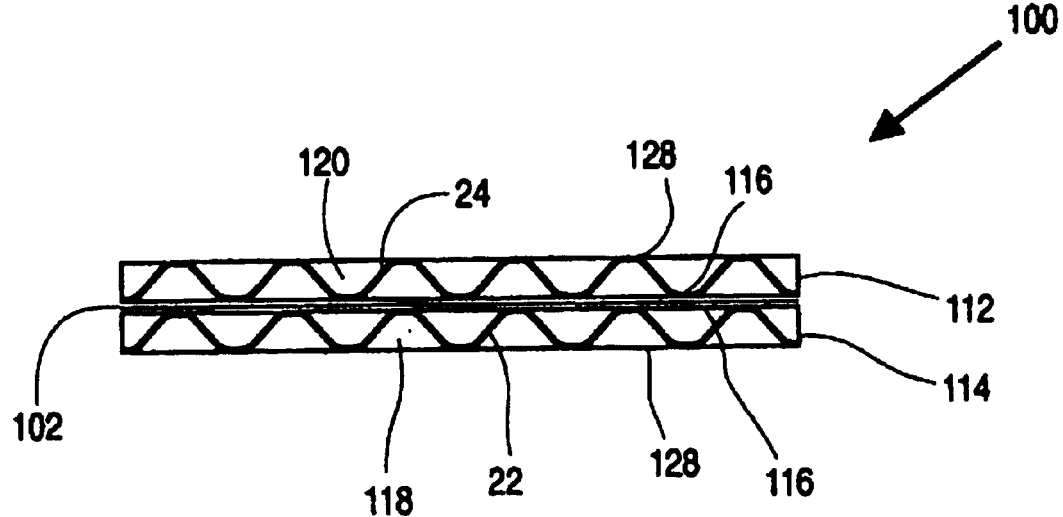

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claims 3–7, dependent on an amended claim, are determined to be patentable.

1. A method for separating construction materials from underground soil, comprising placing a composite bubble-pack assembly between said construction materials and said underground soil, wherein said composite bubble-pack assembly comprises:
   (i) a first bubble-pack having a *bubbled* first thermoplastic film having a plurality of portions *between said bubbles* wherein each of said portions defines a cavity and a second thermoplastic film in *heat* sealed engagement with said first film to [provide a plurality of closed] *close* said cavities;
   (ii) a second bubble pack having a *bubbled* third thermoplastic film having a plurality of portions *between said bubbles* wherein each of said portions defines a cavity and a fourth thermoplastic film in *heat* sealed engagement with said third film to [provide a plurality of closed] *close* said cavities; and
   (iii) a film selected from a thin foil of metal or a metallized thermoplastic film interposed between [and bonded to said first bubble-pack and said second bubble-pack] *said second and fourth thermoplastic films and laminated thereto by heat sealing to provide said composite bubble pack assembly.*

2. The method of claim 1, wherein said metal or metallized thermoplastic is a laminate layer interposed between a pair of polyethylene films to constitute a laminate interposed between and bonded to said first bubble-pack and said second bubble-pack *and laminated thereto by heat sealing.*

* * * * *